US010099811B2

(12) United States Patent
Suzuki et al.

(10) Patent No.: US 10,099,811 B2
(45) Date of Patent: Oct. 16, 2018

(54) METHOD FOR MANUFACTURING BOTTLE

(71) Applicant: YOSHINO KOGYOSHO CO., LTD., Tokyo (JP)

(72) Inventors: Takanori Suzuki, Tokyo (JP); Koji Yoshii, Matsudo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 183 days.

(21) Appl. No.: 15/103,576

(22) PCT Filed: Jan. 23, 2015

(86) PCT No.: PCT/JP2015/051847
§ 371 (c)(1),
(2) Date: Jun. 10, 2016

(87) PCT Pub. No.: WO2015/151559
PCT Pub. Date: Oct. 8, 2015

(65) Prior Publication Data
US 2016/0304232 A1 Oct. 20, 2016

(30) Foreign Application Priority Data

Mar. 31, 2014 (JP) ................. 2014-073266

(51) Int. Cl.
*B65D 1/02* (2006.01)
*B29C 49/08* (2006.01)
(Continued)

(52) U.S. Cl.
CPC ............ *B65D 1/0276* (2013.01); *B29C 49/08* (2013.01); *B29C 49/18* (2013.01); *B29C 49/649* (2013.01);
(Continued)

(58) Field of Classification Search
None
See application file for complete search history.

(56) References Cited

U.S. PATENT DOCUMENTS 5,352,402 A 10/1994 Orimoto et al.
5,389,332 A 2/1995 Amari et al.
(Continued)

FOREIGN PATENT DOCUMENTS

EP 0425360 5/1991
JP 2002-018935 A 1/2002
(Continued)

OTHER PUBLICATIONS

Apr. 7, 2015 International Search Report issued in International Patent Application No. PCT/JP2015/051847.
(Continued)

*Primary Examiner* — Monica A Huson
(74) *Attorney, Agent, or Firm* — Oliff PLC

(57) ABSTRACT

A method for manufacturing a bottle including forming the bottle (10) that is formed in a bottomed tubular shape and has a bottom wall section (19) provided with a contact part (18) positioned at an outer circumferential edge thereof and a deformable tube part that is of a multilevel topped tubular shape, is provided upright at the contact part (18), and blocks an inside of the contact part (18); the method having a primary blow molding process of performing biaxial stretch blow molding on a preform to obtain a primary intermediate molded article; a heat treatment process of heating the primary intermediate molded article to be forcibly shrunken and molded into a secondary intermediate molded article; and a secondary blow molding process of performing blow molding on the secondary intermediate molded article to obtain the bottle (10).

4 Claims, 3 Drawing Sheets

(51) Int. Cl.
  *B29C 49/18*    (2006.01)
  *B29C 49/64*    (2006.01)
  *B29C 49/48*    (2006.01)
  *B29K 67/00*    (2006.01)
  *B29L 31/00*    (2006.01)
(52) U.S. Cl.
  CPC ........ *B29C 49/48* (2013.01); *B29K 2067/003* (2013.01); *B29L 2031/7158* (2013.01)

(56) References Cited

U.S. PATENT DOCUMENTS

| | | |
|---|---|---|
| 6,153,145 A | 11/2000 | Desoutter et al. |
| 2003/0104146 A1 | 6/2003 | Kikuchi et al. |
| 2011/0233166 A1 | 9/2011 | Hiromichi et al. |
| 2012/0248660 A1 | 10/2012 | Beuerle et al. |

FOREIGN PATENT DOCUMENTS

| | | |
|---|---|---|
| WO | 02/44038 A1 | 6/2002 |
| WO | 2010/061758 A1 | 6/2010 |

OTHER PUBLICATIONS

Oct. 20, 2017 Supplementary Search Report issued in European Patent Application No. 15774242.0.

METHOD FOR MANUFACTURING BOTTLE

TECHNICAL FIELD

The present invention relates to a method for manufacturing a bottle.

Priority is claimed on Japanese Patent Application No. 2014-073266, filed on Mar. 31, 2014, the content of which is incorporated herein by reference.

BACKGROUND ART

A bottle formed in a bottomed tubular shape has been known as stated in, for instance, Patent Document 1 below, for a long time. A bottom wall section of this bottle is provided with a contact part that is located at an outer circumferential edge, and a deformable tube part that has a multilevel topped tubular shape and is provided upright at the contact part and blocks an inner side of the contact part.

In this bottle, after this bottle is filled with, for instance, a high-temperature content, when a pressure in the bottle is reduced due to cooling of the content or the like, the deformable tube part is deformed inward in a bottle axial direction, and thereby reduced-pressure absorbing performance is exhibited.

DOCUMENT OF RELATED ART

Patent Document

[Patent Document 1]
PCT International Publication No. WO2010/061758

SUMMARY OF INVENTION

Technical Problem

Meanwhile, when this type of bottle is formed from a preform by biaxial stretch blow molding, an amount of use of a material is easily increased, for instance, due to formation of material accumulation at the deformable tube part having the multilevel topped tubular shape.

Here, to inhibit the amount of use of the material, it is thought to reduce a thickness of the deformable tube part, but heat resistance of the deformable tube part cannot be secured by merely reducing the thickness of the deformable tube part. As a result, for example, when this bottle is filled with the high-temperature content as described above, there is a possibility of the deformable tube part receiving an influence of heat of the content so that the deformable tube part is reversely deformed outward in the bottle axial direction, so-called is subjected to bottom fall, or the like.

As a means for solving this problem, for example, there is a method of raising the temperature of a bottom mold for forming the bottom wall section of the bottle among metal molds for forming the bottle, and forming the bottle using the bottom mold of a high temperature.

However, in this case, there is a possibility of the deformable tube part being easily hardened so that the reduced-pressure absorbing performance caused by the deformable tube part cannot be secured.

The present invention is conceived in view of the aforementioned circumstances this problem, and an object thereof is to reduce a thickness of a deformable tube part while securing reduced-pressure absorbing performance caused by the deformable tube part and heat resistance of the deformable tube part.

Solution to Problem

A method for manufacturing a bottle according to the present invention includes forming the bottle that is formed in a bottomed tubular shape and has a bottom wall section that is provided with a contact part positioned at an outer circumferential edge thereof and a deformable tube part that is of a multilevel topped tubular shape, is provided upright at the contact part, and blocks an inside of the contact part. The deformable tube part includes a rising circumferential wall part that is continuous to the contact part from an inner side in a bottle radial direction and extends toward an upper side that is an inner side in a direction of a bottle axis, an annular movable wall part that protrudes from an upper end of the rising circumferential wall part toward the inner side in the bottle radial direction, and a depressed circumferential wall part that extends upward from an inner end of the movable wall part in the bottle radial direction, and the movable wall part is arranged to be movable upward relative to a connected portion connected with the rising circumferential wall part along with the depressed circumferential wall part. The method includes: a primary blow molding process of performing biaxial stretch blow molding on a preform to obtain a primary intermediate molded article; a heat treatment process of heating the primary intermediate molded article to be forcibly shrunken and molded into a secondary intermediate molded article; and a secondary blow molding process of performing blow molding on the secondary intermediate molded article to obtain the bottle.

In this case, if a pressure in the bottle is reduced, the deformable tube part is deformed, and the movable wall part moves upward along with the depressed circumferential wall part. Thereby, reduced-pressure absorbing performance caused by the deformable tube part is exhibited.

Here, according to the method for manufacturing the bottle, the bottle is formed by so-called double blow molding having the primary blow molding process, the heat treatment process, and the secondary blow molding process. Therefore, in comparison with a case in which so-called single blow molding in which a bottle is formed from a preform by single biaxial stretch blow molding is adopted, a density of the deformable tube part can be improved.

Thereby, even if the deformable tube part is thinned, it is possible to, for example, maintain the density of the movable wall part, and to secure heat resistance of the deformable tube part.

Also, in this way, the double blow molding is adopted to improve the density of the deformable tube part. Thereby, the heat resistance of the deformable tube part can be secured. Therefore, in comparison with a case in which single blow molding is adopted to form the bottle in which equivalent heat resistance is given to the deformable tube part, a temperature of a bottom mold can be kept low. Thereby, reduced-pressure absorbing performance caused by the deformable tube part can also be secured.

The density of the movable wall part may be equal to or more than 1.374 g/cm$^3$.

In this case, the density of the movable wall part may be equal to or more than 1.374 g/cm$^3$, and the density of the movable wall part that is a portion of the deformable tube part which is easy to be positively displaced is increased to a certain level or more. Thereby, it is possible to efficiently secure the heat resistance of the deformable tube part.

Advantageous Effects of Invention

According to the present invention, the deformable tube part can be thinned while securing the reduced-pressure absorbing performance caused by the deformable tube part and the heat resistance of the deformable tube part.

DESCRIPTION OF EMBODIMENTS

Hereinafter, an embodiment of the present invention will be described in detail with reference to the drawings.

Figure 1:
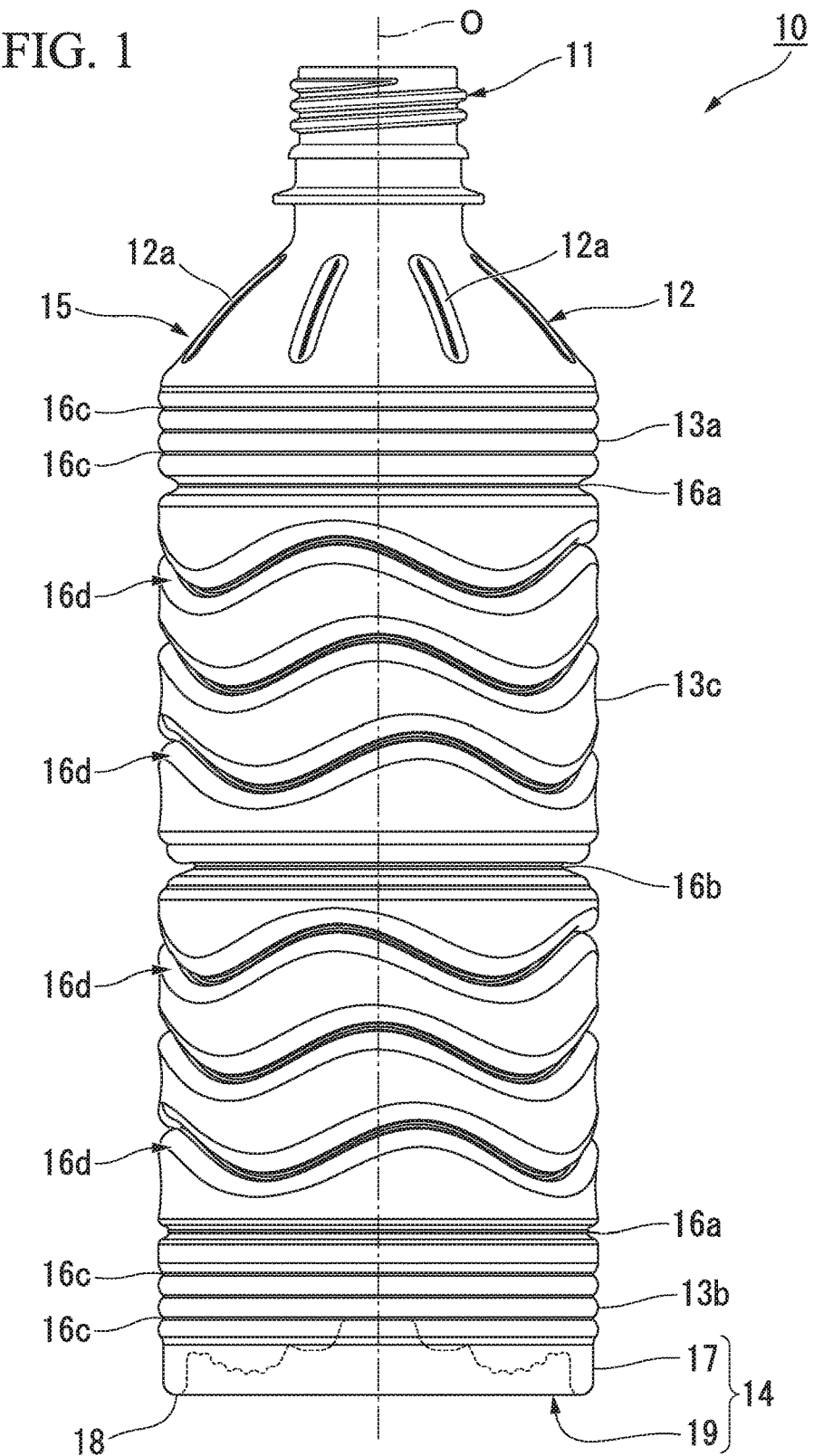
FIG. 1 is a side view of a bottle formed by a method for manufacturing a bottle according to an embodiment of the present invention.

As shown in FIG. 1, a bottle 10 according to the present embodiment is formed in a bottomed tubular shape. The bottle 10 is provided with a mouth section 11, a shoulder section 12, a trunk section 13, and a bottom section 14, and has a schematic constitution in which these are continuously provided in this order with central axes thereof located on a common axis.

Hereinafter, the common axis is referred to as a bottle axis O, a side directed to the mouth section 11 in a direction of the bottle axis O is referred to as an upper side, and a side directed to the bottom section 14 is referred to as a lower side. Also, in a top view when viewed in the direction of the bottle axis O, a direction perpendicular to the bottle axis O is referred to as a bottle radial direction, and a direction revolving around the bottle axis O is referred to as a bottle circumferential direction.

Further, the bottle 10 is integrally formed of, for instance, a synthetic resin material such as polyethylene terephthalate. This bottle 10 may be used as a so-called heat-resistant bottle that is filled with a content, a temperature of which is, for instance, 75° C. to 87° C., and particularly about 85° C. or more.

The mouth section 11 is formed in a tubular shape, and a cap (not shown) is mounted on the mouth section 11. Further, each of the mouth section 11, the shoulder section 12, the trunk section 13, and the bottom section 14 has a circular shape when viewed in a cross section perpendicular to the bottle axis O.

The shoulder section 12 is continuous to a lower end of the mouth section 11, and a diameter thereof is gradually increased toward the lower side. A plurality of longitudinal grooves 12a, which extend along an outer circumferential surface of the shoulder section 12 in the direction of the bottle axis O, are formed in the shoulder section 12 at intervals in a circumferential direction.

The trunk section 13 is formed in a tubular shape. A plurality of partition grooves 16a and 16b, which continuously extend throughout the circumference, are disposed in the trunk section 13 at intervals in the direction of the bottle axis O. The partition grooves 16a and 16b include first partition grooves 16a and a second partition groove 16b.

The first partition grooves 16a are provided in a pair at an interval in the direction of the bottle axis O. The first partition grooves 16a separately partition an upper end 13a and a lower end 13b in the direction of the bottle axis O, and an intermediate part 13c located between both of these ends. The single second partition groove 16b is disposed in the middle of the intermediate part 13c in the direction of the bottle axis O. The second partition groove 16b partitions the intermediate part 13c in the direction of the bottle axis O. The second partition groove 16b is deeper than the first partition grooves 16a.

The opposite ends 13a and 13b of the trunk section 13 in the direction of the bottle axis O are respectively formed with a plurality of narrow grooves 16c, which continuously extend throughout the circumference, at an interval in the direction of the bottle axis O.

The intermediate part 13c of the trunk section 13 in the direction of the bottle axis O is formed with a plurality of circumferential grooves 16d, which continuously extend throughout the circumference, at intervals in the direction of the bottle axis O. The circumferential grooves 16d are formed in respective portions (hereinafter referred to as "partition portions") into which the intermediate part 13c is partitioned with the second partition groove 16b in a plural number, and in the same number as in the shown example.

The circumferential grooves 16d have a wider width than the narrow groove 16c. The circumferential grooves 16d are deeper than the narrow groove 16c. The plurality of circumferential grooves 16d are disposed over the whole areas of the respective partition portions of the intermediate part 13c of the trunk section 13 in the direction of the bottle axis O at intervals in the direction of the bottle axis O. The circumferential grooves 16d have waveforms that have the same shapes and sizes and periodically extend in a circumferential direction while being bent in the direction of the bottle axis O in a side view of the trunk section 13. The circumferential grooves 16d adjacent to each other in the direction of the bottle axis O are separated from each other throughout the circumference in the direction of the bottle axis O. Phases of the circumferential grooves 16d adjacent to each other in the direction of the bottle axis O are shifted from each other.

The bottom section 14 is formed in the shape of a cup that is continuous to the lower end 13b of the trunk section 13 and blocks a lower end opening of the trunk section 13. To be specific, the bottom section 14 is formed in the shape of a cup that is provided with a heel part 17, an upper end opening of which is connected to the lower end opening of the trunk section 13, and a bottom wall section 19 which blocks a lower end opening of the heel part 17 and an outer circumferential edge of which becomes a contact part 18.

Figure 2:
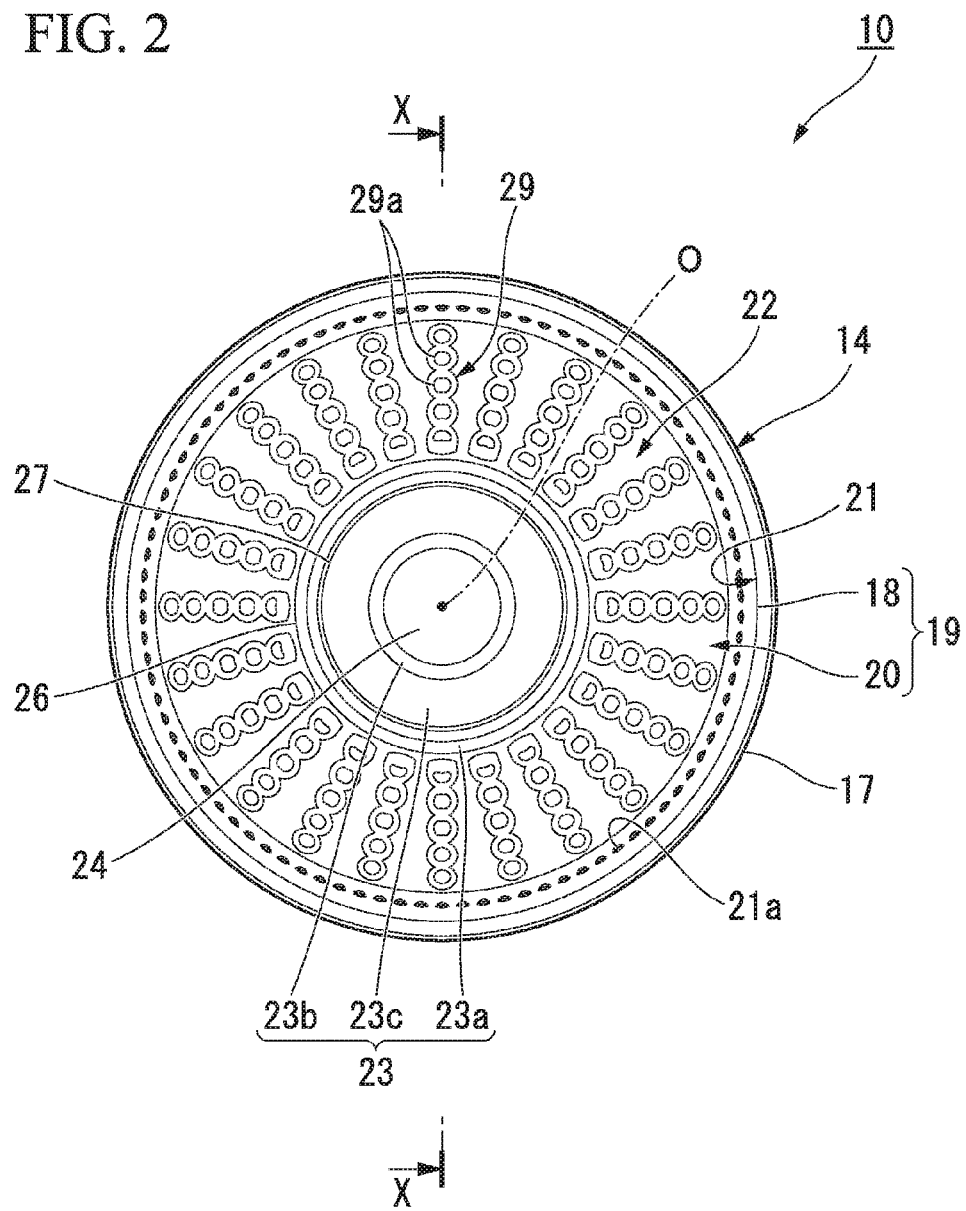
FIG. 2 is a bottom view of the bottle shown in FIG. 1.
Figure 3:
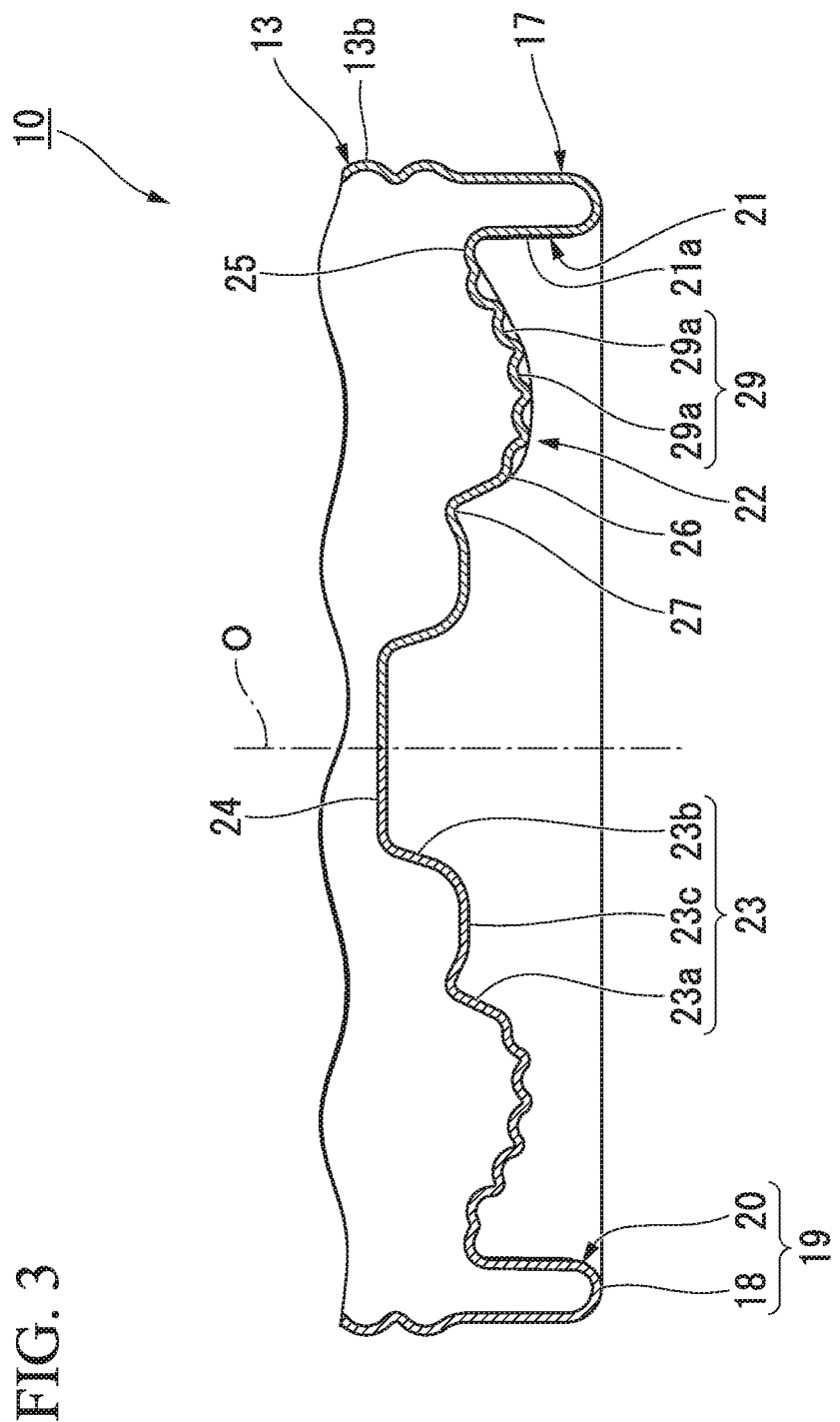
FIG. 3 is a sectional view taken along line X-X of the bottle shown in FIG. 2 when viewed in an arrow direction.

As shown in FIGS. 2 and 3, the contact part 18 of the bottom wall section 19 is formed in the shape of a ring that is disposed coaxially with the bottle axis O, and continuously extends throughout the circumference in the bottle circumferential direction. A deformable tube part 20 that is of a multilevel topped tubular shape and blocks the inside of the contact part 18 is provided upright at the contact part 18.

Of tubular parts constituting this deformable tube part 20, an upper tubular part located at an upper side (an inner side in the direction of the bottle axis) is deformed to be relatively displaced upward relative to a lower tubular part located at a lower side (an outer side in the direction of the bottle axis), and thereby the deformable tube part 20 exhibits reduced-pressure absorbing performance.

As shown in FIG. 3, the deformable tube part 20 is provided with a rising circumferential wall part 21 that is continuous to the contact part 18 from the inner side in the bottle radial direction and extends upward, an annular movable wall part 22 that protrudes from an upper end of the rising circumferential wall part 21 toward the inner side in the bottle radial direction, and a depressed circumferential wall part 23 that extends upward from an inner end of the movable wall part 22 in the bottle radial direction.

An uneven part 21a is formed at the rising circumferential wall part 21 throughout the circumference. The uneven part 21a is configured such that a plurality of protrusions formed in a curved surface shape protruding toward the inner side in the bottle radial direction are arranged at intervals in the bottle circumferential direction.

The movable wall part 22 is formed in a curved surface shape protruding downward, and gradually extends downward from the outer side toward the inner side in the bottle radial direction. The movable wall part 22 and the rising circumferential wall part 21 are connected via a curved surface part (a portion connected with the rising circumferential wall part) 25 protruding upward. The movable wall part 22 is configured to be movable relative to the curved surface part 25 to displace the depressed circumferential wall part 23 toward the upper side.

As shown in FIGS. 2 and 3, the movable wall part 22 has a plurality of ribs 29 that are radially arranged around the bottle axis O. The ribs 29 are configured such that a plurality of recesses 29a recessed upward in a curved surface shape are intermittently arranged in the bottle radial direction. Inner ends of the ribs 29 in the bottle radial direction may be located within the movable wall part 22 or within the depressed circumferential wall part 23.

In the present embodiment here, a density of the movable wall part 22 is equal to or more than 1.374 g/cm$^3$, and a portion of the movable wall part 22 which has the lowest density has a density of 1.374 g/cm$^3$ or more.

The depressed circumferential wall part 23 is disposed coaxially with the bottle axis O, and a top wall 24 disposed coaxially with the bottle axis O is connected to an upper end of the depressed circumferential wall part 23. The depressed circumferential wall part 23 and the top wall 24 have a topped tubular shape as a whole. The depressed circumferential wall part 23 is formed in a cylindrical shape. The top wall 24 is formed in a tabular shape.

As shown in FIG. 3, the depressed circumferential wall part 23 is formed in the shape of a multilevel tube, a diameter of which is gradually increased from an upper side toward a lower side thereof. The depressed circumferential wall part 23 is provided with a lower tube part 23a, a diameter of which is gradually reduced from the inner end of the movable wall part 22 in the bottle radial direction toward an upper side thereof, an upper tube part 23b, a diameter of which is gradually increased from an outer circumferential edge of the top wall 24 toward a lower side thereof and which has a smaller diameter than the lower tube part 23a, and an annular step part 23c that connects together the tube parts 23a and 23b.

In a longitudinal sectional view of the deformable tube part 20, the lower tube part 23a and the upper tube part 23b extend in a straight line shape, and are inclined with respect to the bottle axis O. In the longitudinal sectional view, an inclined angle of the lower tube part 23a is greater than that of the upper tube part 23b.

The lower tube part 23a is connected to the inner end of the movable wall part 22 in the bottle radial direction via a curved surface part 26 protruding downward. The curved surface part 26 faces the inner side in the bottle radial direction, and protrudes obliquely downward. The curved surface part 26 smoothly connects the movable wall part 22 and the lower tube part 23a without a level difference. A connected portion between the upper tube part 23b and the top wall 24 faces the outer side in the bottle radial direction, and is formed in the shape of a curved surface that protrudes obliquely upward.

The annular step part 23c has inner and outer surfaces facing the direction of the bottle axis O, and is formed in a tabular shape. The annular step part 23c is located at a height equal to that of the upper end of the rising circumferential wall part 21 in the direction of the bottle axis O.

An outer circumferential edge of the annular step part 23c is provided with a concave strip part 27 recessed upward. The concave strip part 27 continuously extends throughout the circumference in a circumferential direction. The concave strip part 27 is formed in the shape of a curved surface protruding upward. An outer circumferential surface of the concave strip part 27 which faces the inner side in the bottle radial direction is smoothly continuous to the lower tube part 23a without a level difference. A connected portion between the annular step part 23c and the upper tube part 23b faces the inner side in the bottle radial direction, and is formed in the shape of a curved surface that protrudes obliquely downward.

In the bottle 10, when an internal pressure of the bottle 10 varies, the movable wall part 22 is turned upward to allow the variation in the internal pressure to be absorbed. Thereby, it is possible to suppress deformation of each of the shoulder section 12 and the trunk section 13 in the bottle radial direction.

Next, an example of a method for manufacturing the bottle 10 will be described. This manufacturing method has a primary blow molding process of carrying out biaxial stretch blow molding on a preform to obtain a primary intermediate molded article, a heat treatment process of heating the primary intermediate molded article to be forcibly shrunken and molded into a secondary intermediate molded article, and a secondary blow molding process of carrying out blow molding on the secondary intermediate molded article to obtain the bottle 10.

The primary blow molding process is carried out in analogy with, for instance, typical biaxial stretch blow molding. At this point, a main body part that include portions other than a portion becoming the mouth section in the perform, i.e. portions becoming the shoulder section 12, the trunk section 13, and the bottom section 14 is stretched and molded.

In the heat treatment process, internal residual stress occurring in the primary intermediate molded article is forcibly removed, and crystallization of the primary intermediate molded article is accelerated. Further, in this heat treatment process, a metal mold for the primary blow molding process may be used. At this point, in the primary intermediate molded article, according to internal residual stress generated in each of portions molded by stretching the main body part of the preform (hereinafter referred to as "stretched and molded portion"), the stretched and molded portion is freely shrunken and deformed to forcibly remove the internal residual stress. Thereby, the secondary intermediate molded article is molded.

Further, the stretched and molded portion in the secondary intermediate molded article has a size equal to or slightly smaller than a bottle main body 15 including the shoulder section 12, the trunk section 13, and the bottom section 14 in the bottle 10. The size of the stretched and molded portion in the secondary intermediate molded article may be adjusted, for instance, by setting a magnification of stretch molding from the preform into the primary intermediate molded article, and dimensions of the primary intermediate molded article.

The secondary blow molding process is carried out similar to typical biaxial stretch blow molding. At this point, a stretching magnification is smaller compared to the primary blow molding process of the stretched and molded portion in the secondary intermediate molded article.

Thereby, the bottle 10 is formed from the preform.

As described above, according to the method for manufacturing the bottle according to the present embodiment, the bottle 10 is formed by so-called double blow molding that has the primary blow molding process, the heat treatment process, and the secondary blow molding process. Therefore, in comparison with a case in which so-called single blow molding in which the bottle 10 is formed by single biaxial stretch blow molding is employed, a density of the deformable tube part 20 can be improved. Thereby, even if the deformable tube part 20 is thinned, it is possible, for instance, to maintain a density of the movable wall part 22, and secure heat resistance of the deformable tube part 20.

Also, the density of the movable wall part 22 is equal to or more than 1.374 g/cm³, and the density of the movable wall part 22 that is a portion of the deformable tube part 20 which is easy to be positively displaced is increased to a certain level or more. Thereby, it is possible to efficiently secure the heat resistance of the deformable tube part 20.

Also, as described above, the double blow molding is adopted to improve the density of the deformable tube part 20, and thereby the heat resistance of the deformable tube part 20 can be secured. Accordingly, in comparison with a case in which the single blow molding is adopted and then the bottle 10 imparting the deformable tube part 20 with equivalent heat resistance is formed, a temperature of the bottom mold can be kept low. Thereby, the reduced-pressure absorbing performance caused by the deformable tube part 20 can also be secured.

The technical scope of the present invention is not limited to the aforementioned embodiment, but the present invention may be modified in various ways without departing from the gist of the present invention.

The longitudinal grooves 12a, the partition grooves 16a and 16b, the narrow groove 16c, and the circumferential grooves 16d are dispensable.

The rising circumferential wall part 21 may be appropriately modified to, for instance, extend in parallel in the direction of the bottle axis O or extend to be inclined with respect to the bottle axis O.

The movable wall part 22 may be appropriately modified to, for instance, protrude in parallel in the bottle radial direction.

The synthetic resin material of which the bottle 10 is formed is not limited to polyethylene terephthalate, but it may be appropriately modified to, for instance, polyethylene naphthalate, amorphous polyester, or the like, or a blend material thereof.

The bottle 10 is not limited to a single-layered structure, but it may be a stacked structure having an intermediate layer. This intermediate layer may include, for instance, a layer formed of a resin material having a gas barrier characteristic, a layer formed of a recycled material, or a layer formed of a resin material having oxygen absorbability.

In the aforementioned embodiment, the shape of each of the shoulder section 12, the trunk section 13, and the bottom section 14 when viewed in the cross section perpendicular to the bottle axis O is set as the circular shape, but without being limited thereto, it may be appropriately modified to, for instance, be a polygonal shape.

In addition, without departing from the gist of the present invention, the components in the aforementioned embodiment may be appropriately substituted with well-known components, and furthermore, they may be appropriately combined with the aforementioned modifications.

Next, a verification test for verifying the operation and effects described above will be described.

In this verification test, as Comparative Examples 1 to 4 and Embodiment 1, five bottles having the structure shown in the aforementioned embodiment were formed by making molding conditions different from one another. The molding conditions, and so on of each bottle are presented in Table 1 below.

TABLE 1

|  | Comparative Example | | | | Embodiment |
|---|---|---|---|---|---|
|  | 1 | 2 | 3 | 4 | 1 |
| Molding method | Single blow | | | | Double blow |
| Temperature of bottom mold |  | 50° C. | | 120° C. | 50° C. |
| Average value of thicknesses of deformable tube part (mm) | 0.41 | 0.44 | 0.49 | 0.40 | 0.32 |
| Weight of deformable tube part (g) | 2.0 | 2.4 | 3.2 | 2.0 | 1.84 |
| Density at outer circumferential portion of movable wall part (g/cm³) |  | 1.369 | | 1.375 | 1.373 |
| Density at inner circumferential portion of movable wall part (g/cm³) |  | 1.375 | | 1.374 | 1.375 |
| Heat-resistant temperature |  | 70° C. | | 87° C. | 87° C. |

(Molding Method, Temperature of Bottom Mold, Average Value of Thicknesses of Deformable Tube Part, and Weight of Deformable Tube Part)

As presented in Table 1, in Comparative Examples 1 to 4, a bottle was formed from a preform by single blow molding, i.e. single biaxial stretch blow molding. In Embodiment 1, a bottle was formed by the method for manufacturing the bottle, which has been described in the aforementioned embodiment.

In Comparative Examples 1 to 3, a temperature of the bottom mold was set to 50° C. In Comparative Example 4, a temperature of the bottom mold was set to 120° C. In Embodiment 1, a temperature of the bottom mold in a secondary blow molding process was set to 50° C.

Further, an average value of thicknesses of the deformable tube part and weight (mass) of the deformable tube part are as presented in Table 1. The bottles according to Comparative Examples 1 to 4 and Embodiment 1 have the same structures, but they are different from one another in the thickness and weight of the deformable tube part.

(Density of Movable Wall Part and Heat-Resistant Temperature)

With respect to each of Comparative Examples 1 to 4 and Embodiment 1, a density at the outer circumferential portion of the movable wall part, a density at the inner circumferential portion of the movable wall part, and a heat-resistant temperature are as presented in Table 1. The heat-resistant temperature refers to an upper limit of a temperature of a content, at which, when the content is filled in the bottle, the deformable tube part of the bottle can absorb a reduced pressure without deformation during cooling.

It was ascertained from this result by comparing the density at the outer circumferential portion of the movable wall part of each of Comparative Examples 1 to 3 with that of Comparative Example 4, if the temperature of the bottom mold is raised, the density of the movable wall part can be increased. Also, as a result, it was ascertained that the heat-resistant temperature was also raised.

Thus, it was ascertained that, after Embodiment 1 was added to Comparative Examples 1 to 3 and Comparative Example 4, the densities at the outer circumferential portions of the movable wall parts were compared with one another, and thereby the density of the movable wall part could be increased without raising the temperature of the bottom mold when the bottle was formed by double blow molding. Also, as a result, it was ascertained that the heat-resistant temperature was also raised.

(Reduced-Pressure Absorbing Performance)

With respect to each of Comparative Examples 1 to 4 and Embodiment 1, reduced-pressure absorbing performance (not set forth in Table 1) was ascertained. As a result, Comparative Examples 1 to 3 and Embodiment 1 exhibited equivalent reduced-pressure absorbing performance, but Comparative Example 4 had a worse reduced-pressure absorbing performance than Comparative Examples 1 to 3 and Embodiment 1. It was ascertained from this result that the bottle was formed by double blow molding, the temperature of the bottom mold was kept low, and thereby the reduced-pressure absorbing performance was secured.

INDUSTRIAL APPLICABILITY

According to the present invention, the deformable tube part can be thinned while securing the reduced-pressure absorbing performance caused by the deformable tube part and the heat resistance of the deformable tube part.

DESCRIPTION OF REFERENCE SIGNS

10 Bottle
18 Contact part
19 Bottom wall section
20 Deformable tube part
21 Rising circumferential wall part
22 Movable wall part
23 Depressed circumferential wall part
25 Curved surface part (connected portion connected with rising circumferential wall part)
O bottle axis

What is claimed is:

1. A method for manufacturing a bottle that is formed in a bottomed tubular shape,
the method comprising:
a primary blow molding process of performing biaxial stretch blow molding on a preform to obtain a primary intermediate molded article;
a heat treatment process of heating the primary intermediate molded article to be forcibly shrunken and molded into a secondary intermediate molded article; and
a secondary blow molding process of performing blow molding on the secondary intermediate molded article to obtain the bottle,
wherein the bottle comprises a bottom wall section provided with a contact part positioned at an outer circumferential edge thereof and a deformable tube part that is of a multilevel topped tubular shape and blocks an inside of the contact part,
the deformable tube part includes a rising circumferential wall part that is continuous to the contact part and extends upward toward an interior of the bottle, a movable wall part that protrudes from an upper end of the rising circumferential wall part toward a central axis of the bottle, and a depressed circumferential wall part that extends upward from an inner end of the movable wall part, and
the movable wall part is arranged to be movable, along with the depressed circumferential wall part, upward relative to a connected portion connected with the rising circumferential wall part, whereby in a reduced-pressure condition in the bottle, deformation of a shoulder section of the bottle and a trunk section of the bottle is suppressed.

2. The method according to claim 1, wherein a density of the movable wall part is equal to or more than 1.374 g/cm$^3$.

3. The method according to claim 1, wherein the movable wall part has a plurality of ribs that are radially arranged around the bottle axis, the ribs being configured such that a plurality of recesses recessed upward in a curved surface shape are intermittently arranged in the bottle radial direction.

4. The method according to claim 1, wherein the movable wall part extends downward relative to the connected portion.

* * * * *